(12) United States Patent
Ashmore

(10) Patent No.: US 6,527,024 B1
(45) Date of Patent: Mar. 4, 2003

(54) TIRE HAVING TREAD INCLUDING SHOULDER GROOVES

(75) Inventor: Stephen Michael Ashmore, Solihull (GB)

(73) Assignee: Sumitomo Rubber Industries Limited, Hyogo-ken (JP)

( * ) Notice: Subject to any disclaimer, the term of this patent is extended or adjusted under 35 U.S.C. 154(b) by 0 days.

(21) Appl. No.: 09/496,587

(22) Filed: Feb. 2, 2000

(30) Foreign Application Priority Data

Feb. 5, 1999 (GB) .............................................. 9902449

(51) Int. Cl.$^7$ ......................... B60C 11/11; B60C 11/13; B60C 103/00; B60C 115/00
(52) U.S. Cl. ............................ 152/209.22; 152/209.24; 152/209.28
(58) Field of Search ..................... 152/209.22, 209.28, 152/209.24

(56) References Cited

U.S. PATENT DOCUMENTS

| | | | | |
|---|---|---|---|---|
| 5,044,414 A | * | 9/1991 | Ushikubo | 152/209.24 |
| 5,127,455 A | * | 7/1992 | Remick | 152/209.24 |
| 5,297,604 A | | 3/1994 | Lurois | |
| 6,065,517 A | * | 5/2000 | Maruyama | 152/209.24 |
| 6,206,064 B1 | * | 3/2001 | Takahashi | 152/209.24 |

FOREIGN PATENT DOCUMENTS

| | | | | |
|---|---|---|---|---|
| EP | 524567 | * | 1/1993 | 152/209.24 |
| EP | 0635382 | | 1/1995 | |
| JP | 61-200007 | * | 9/1986 | 152/209.24 |
| JP | 3-128704 | * | 5/1991 | 152/209.22 |
| JP | 5-254311 | * | 10/1993 | 152/209.28 |
| JP | 6-171312 | * | 6/1994 | 152/209.24 |
| WO | WO 96/36501 | * | 11/1996 | 152/209.22 |

\* cited by examiner

*Primary Examiner*—Steven D. Maki
(74) *Attorney, Agent, or Firm*—Birch, Stewart, Kolasch &Birch, LLP

(57) ABSTRACT

A tire having a ground contacting tread, the tread having a directional tread pattern comprising at least two substantially circumferentially extending grooves disposed one each side of the tread circumferential centerline and a plurality of circumferentially spaced apart and substantially axially extending shoulder grooves extending axially outwardly from each circumferential groove to the tread edge to define a row of tread blocks in each axially outer tread shoulder part, the axially extending grooves having two opposing inclined sidewalls which provide ramp support to the adjacent tread block edge, characterized in that each of the axially extending shoulder grooves has a groove depth which reduces from the axially inward part to towards the axially outer part, and each groove comprises two groove main portions connected end to end, each groove main portion having a varying asymmetric cross-section along its length, each groove main portion having a first groove sidewall having a constant first angle of inclination and the opposing second groove sidewall having a varying second inclination angle, the constant first angle being greater than the maximum value of the second inclination angle, the first groove sidewall of each groove main portion being disposed on the same side of the axial groove.

14 Claims, 5 Drawing Sheets

TIRE HAVING TREAD INCLUDING SHOULDER GROOVES

The present invention relates to a block-type tread for a pneumatic tire, and particularly, but not exclusively, to a tread for a heavy duty tire such as used on trucks, trailers or buses.

A problem occurring with block-type tire tread patterns and particularly in heavy duty tires is so-called 'heel and toe' irregular wear. This occurs when the leading front portion of the tread block wears more rapidly than the rear trailing edge as the tread block passes through the contact region with the road surface, and is manifest as a saw-tooth profile to rows of blocks around the tread circumference. Whilst such irregular wear is apt to occur across the whole tread it is found to be worse in the axially outer shoulder regions.

The effect of such heel and toe irregular wear is to disfigure the pattern appearance, reduce the performance of the tread design and shorten the life of the tire.

Whilst the problem of such irregular wear may be partially mitigated by stripping the tire off the wheelrim and refitting with the reverse orientation such practice is unsatisfactory particularly in the case of a directional tread pattern which is specifically designed to be advantageously run only in one orientation.

It is known from U.S. Pat. No. 5,297,604 to provide a block-type tire tread pattern having constant and symmetrical buttressing of the blocks in the central region whilst having variable and asymmetrical buttressing to the blocks in the two axially outer median parts. According to U.S. Pat. No. 5,297,604 the values of inclination of the groove sidewalls forming the leading and trailing edges of the blocks in the outer median parts is not critical in reducing irregular wear, it is necessary only that there is asymmetry of the values.

The applicants have investigated the proposal of the prior art and found that it does not solve the problem of irregular heel and toe wear.

It is an object of the present invention to mitigate the effects of heel and toe irregular wear of a block tread pattern across the entire width of the tread and thus provide a tire having an improved block tread pattern.

According to the invention there is provided a tire having a ground contacting tread, the tread having a directional tread pattern comprising at least two substantially circumferentially extending grooves disposed one each side of the tread circumferential centerline and a plurality of circumferentially spaced apart and substantially axially extending shoulder grooves extending axially outwardly from each circumferential groove to the tread edge to define a row of tread blocks in each axially outer tread shoulder part, the axially extending grooves having two opposing inclined sidewalls which provide support to the adjacent tread block edge, characterized in that each of the axially extending shoulder grooves has a groove depth which reduces from the axially inward part to towards the axially outer part, and each groove comprises two groove main portions connected end to end, each groove main portion having a varying asymmetric cross-section along its length, each groove main portion having a first groove sidewall having a constant first angle of inclination and the opposing second groove sidewall having a varying second inclination angle, the constant first angle being greater than the maximum value of the second inclination angle, the first groove sidewall of each groove main portion being disposed on the same side of the axial groove.

Further aspects of the invention will become apparent from the following description, by way of example only, of one embodiment of the invention in conjunction with the following drawings in which.

In the following by "groove cross-sectional width" is meant the linear distance at the tread surface measured perpendicularly to the groove longitudinal centerline, and "groove sidewall inclination at a point on a groove" means the inclination of the sidewall at the tread surface with respect of a line normal to the surface as shown in FIGS. 5a–5k.

Figure 5:
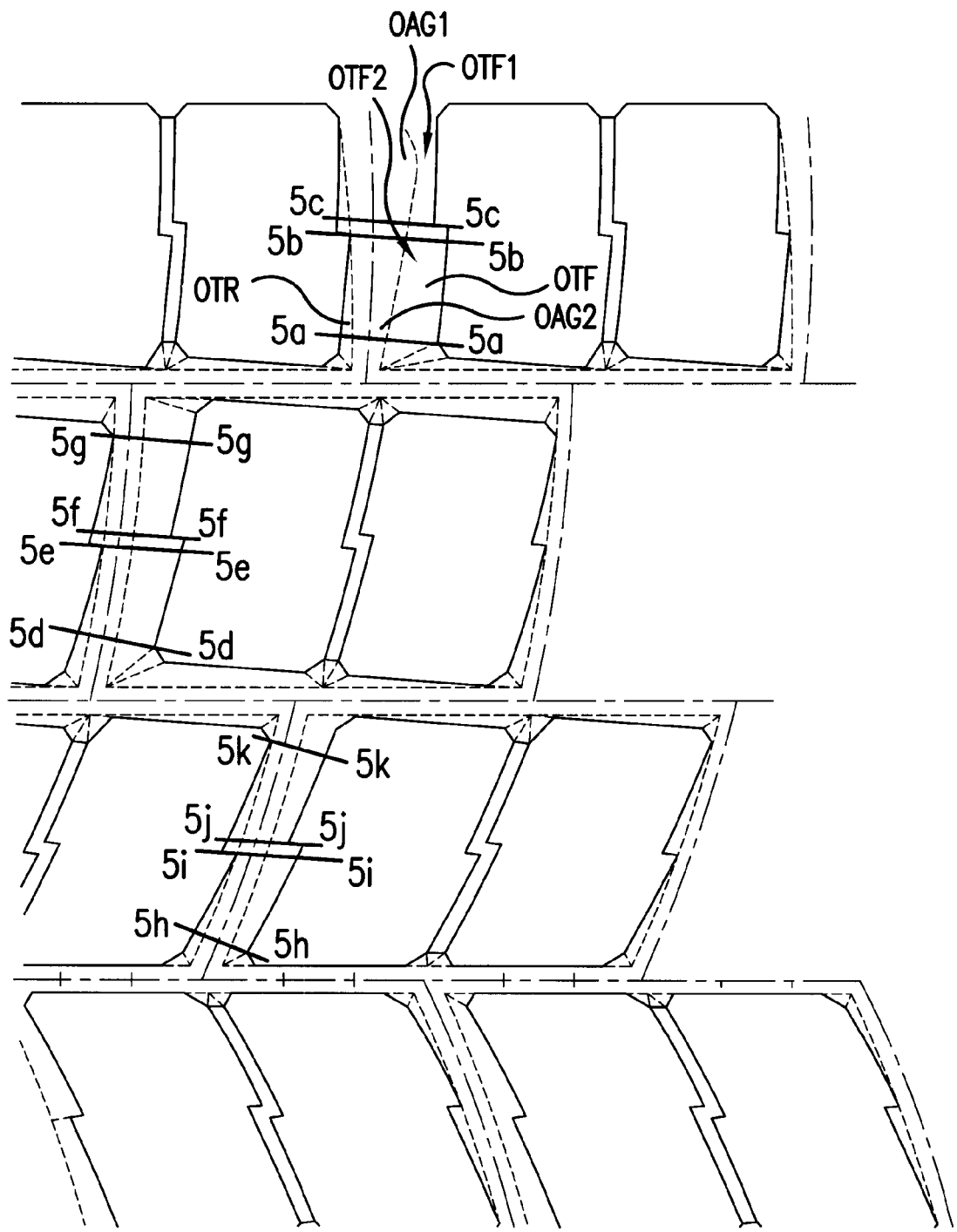
FIGS. 5 and 5a–5k show details of the cross-sectional shape of the axial tread grooves of the tire of FIG. 1.
Figure 5A:
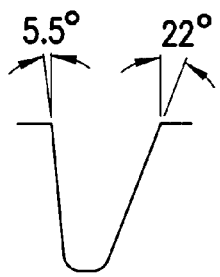
Figure 5B:
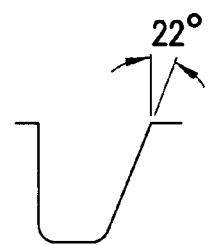
Figure 5C:
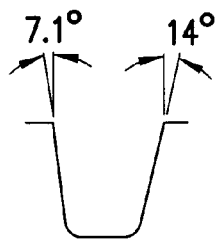
Figure 5D:
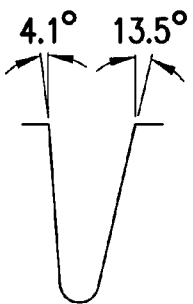
Figure 5E:
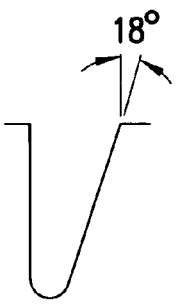
Figure 5F:
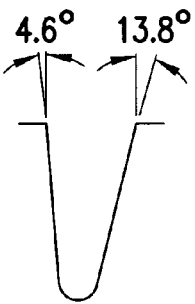
Figure 5G:
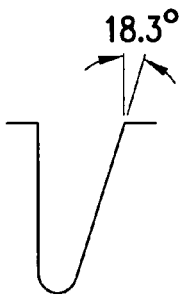
Figure 5H:
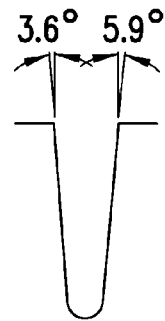
Figure 5I:
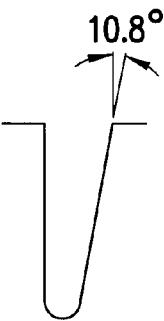
Figure 5J:
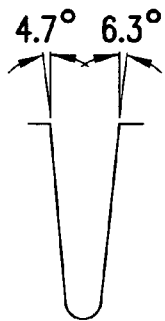
Figure 5K:
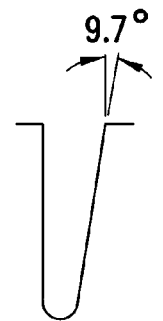

Further by groove base portion GBP is meant the radiused portion connecting the opposing groove sidewalls at their radially innermost part as shown in FIG. 5d.

Figure 1:
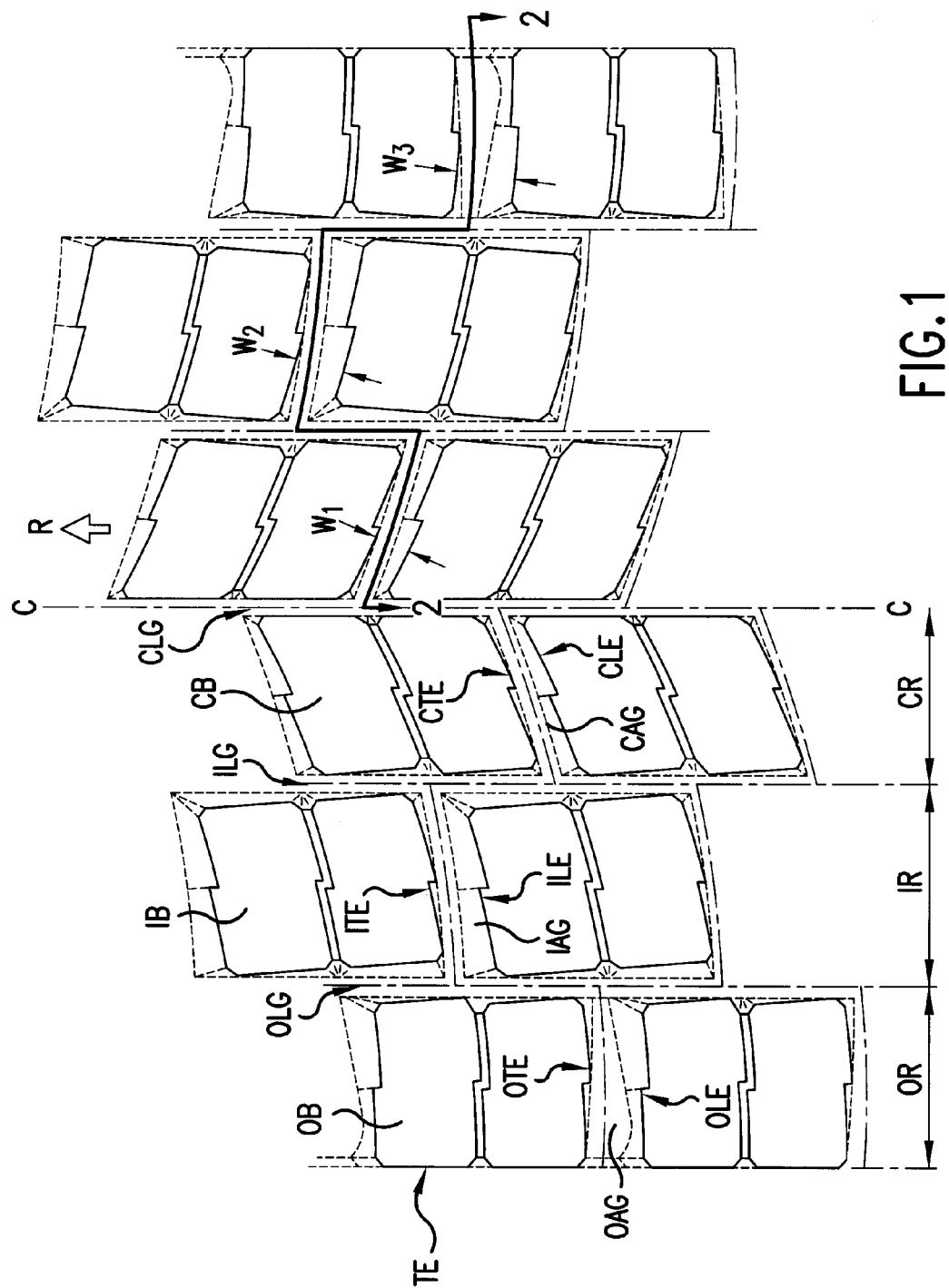
FIG. 1 shows a schematic plan view of a tread pattern of a tire in accordance with the invention.
Figure 2:
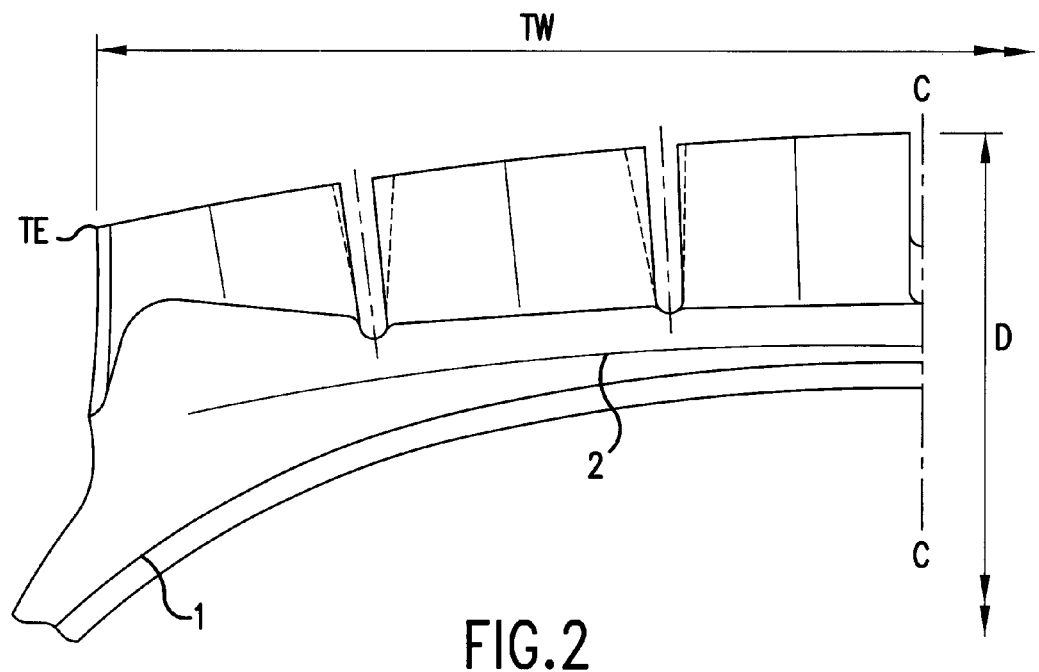
FIG. 2 shows a schematic scrap section of the tire tread of FIG. 1 taken along section "2"—"2"

Shown in FIGS. 1 and 2 is the tread region of a heavy duty vehicle tire of size 295/80R22.5. The tire has a radially extending carcass having ends wrapped around inextensible bead coils disposed one in each wheelrim contacting bead region (not shown). The tread region is reinforced by a breaker assembly 2 comprising plural plies of metal cords which are crossed with respect to the cords of adjacent plies.

The tire had a tread width TW measured between the axially outer edges TF of the tread of 255 mm.

The tread pattern formed on the radially outer part of the tread region comprises a central longitudinal groove CLG extending continuously circumferentially centered on the tire circumferential centerline C—C. To either side of the circumferential center there are two additional longitudinal circumferentially extending grooves; and intermediate longitudinal groove ILG axially adjacent to the central longitudinal groove CLG and an outer longitudinal groove OLG axially outside the intermediate longitudinal groove. These two additional longitudinal grooves together with the central longitudinal groove and the tread edge TE divide each half of the tread axially into central, intermediate and outer regions CR, IR, OR respectively. These regions are of approximately equal axial width being 32%, 36% and 32% respectively of the half tread width.

Each of the three tread regions CR, IR and OR is further provided with a series of axial grooves CAG, IAG and OAG respectively which are spaced apart in the circumferential direction and extend fully across their respective region to divide the region into a row of individual tread blocks CB, IB and OB respectively. The axially outer grooves are hereinafter referred to as shoulder grooves OAG.

Each of the circumferential grooves and the axial grooves CAG and OAG has a generally asymmetric "V"-shaped cross-section with a radiused groove base and it is the opposing inclined sidewalls of these grooves which provide ramp support or buttressing of the leading and trailing axially extending edges of individual tread blocks. The axial groove OAG has a profile which changes from V-shaped to flat bottomed proceeding axially outward as illustrated in FIGS. 5a–5c.

As shown in FIG. 1 both the width $W_1$, $W_2$, $W_3$ of the axial tread grooves and their inclination to the circumferential direction increases with increasing axial displacement from the circumferential centerline C. In this embodiment each of the axial grooves is slightly curved rather than being a straight groove. The tread pattern is directional as the arrangement of grooves and blocks on one side of the centerline C is a reflection of that on the other side. To ensure the pattern is used in the correct direction of rotation an arrow or other marker is provided on the sidewall or the directional appearance of the tread used to set the fitting direction. In this particular embodiment there is also a circumferential displacement of approximately half a pattern pitch length between the two halves of the pattern.

The tread pattern of the present embodiment is intended to be used in an orientation providing forward rotation in the direction of arrow R shown in FIG. 1. Accordingly the leading edges CLE, ILE and OLE of the tread blocks of the respective central intermediate and outer regions CR, IR and OR are as shown in FIG. 1 on the upper edge of the blocks whilst the complimentary trailing edges CTE, ITE and OTE are at lower edges of the block.

In this embodiment each of the axial grooves CAG, IAG and OAG comprises three portions. Thus, each axial groove has two main groove portions, shown as GP1 and GP2 in FIG. 3, which shows details of an intermediate axial groove IAG by way of illustration of some features of all axial grooves. Each of the two main groove portions are substantially equal in width and length and extend almost halfway across the respective region. In the middle of the region the two main groove portions are connected together by a short groove portion shown as CP.

Figure 3:
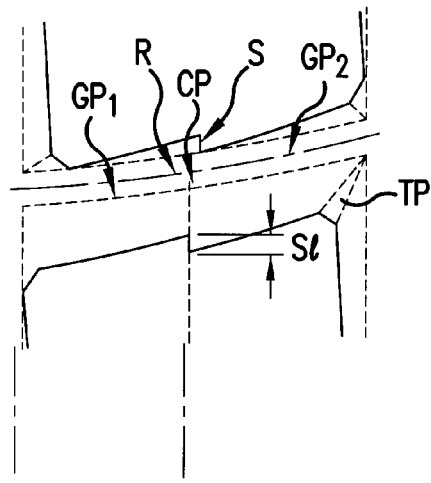
FIG. 3 shows details of one of the axial grooves of the tire of FIG. 1.

In the radially inner region of their groove base, the three groove portions are formed in mutual alignment as indicated by the pairs of broken lines shown in FIG. 3. Thus the groove base extends in a smooth continuous curve along the groove. However in their radially outer regions the two main groove portions are formed in a non-aligned configuration. Thus in the middle region a small step or circumferential dislocation S between the two main groove portions is introduced via the connecting short groove portion CP. The magnitude of this circumferential dislocation increases with the distance from the groove base and it has a maximum value Sl at the tread surface of between 10 and 30% of the maximum width of the axial groove. Thus, each of the main groove portions extend substantially in the same direction excepting the small circumferential displacement in their radially outer parts.

As said previously each of the axial grooves CAG, IAG, OAG is slightly curved in its longitudinal direction. In this embodiment each has a radius of curvature R of 250 mm.

As shown in FIG. 3, each of the tread block corners defined by the junction of an axial groove and a circumferential groove has a truncated portion TP which avoids a sharp corner and serves to avoid excessive wearing at the corner.

With the exception of the region of the truncated portion TP at the junction of the axial and circumferential grooves, for each axial groove the cross-sectional width of the two axial groove main portions GP1 and GP2 are equal and constant along their length. In this embodiment the width of the main groove portions of the central, intermediate and outer grooves are respectively 8, 11 and 14 mm which represent 0.75, 1.03 and 1.3% of the maximum tire outer diameter D measured at the tire circumferential centerline.

Figure 4:
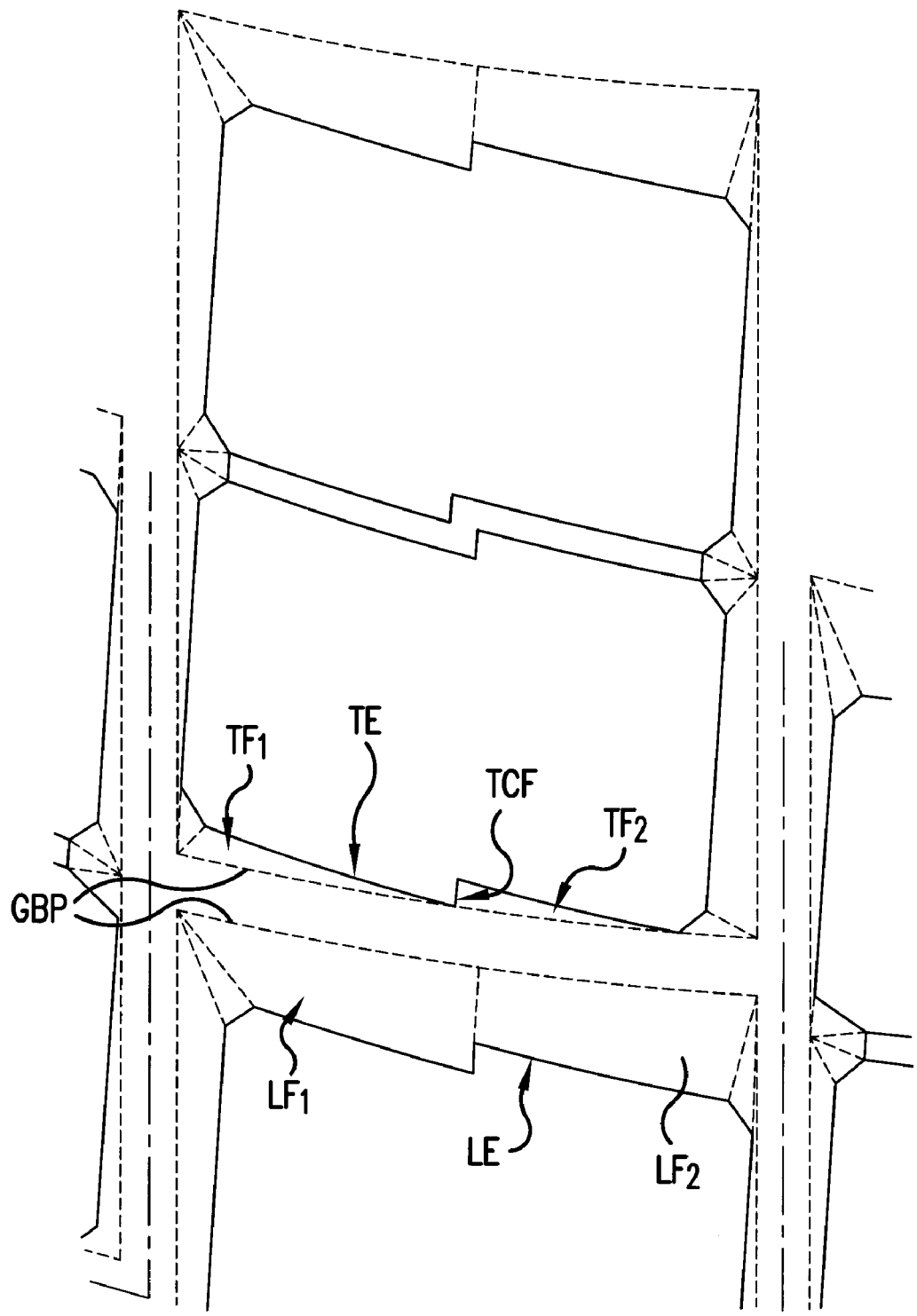
FIG. 4 shows details of the groove sidewalls of one of the axial grooves of the tire of FIG. 1.

The axial grooves CAG and IAG of the central and intermediate region are substantially at full depth along their length. Further details of the configuration of grooves CAG and IAG are shown in FIG. 4. The aforementioned difference in the alignment of the groove base and the two groove main portions determines a configuration in which each of the two sidewalls of the groove consists of three faces. Thus each consists of two generally axially extending faces, marked as TF1, TF2 and LF1, LF2 in FIG. 4, connected by a smaller face TCF, LCF extending circumferentially and normally to the tread surface. Each of the axially extending faces is inclined with respect of the tread surface and curved in the axial direction.

Whilst the radius groove base extends in a continuous smooth curve, shown in FIG. 4 by the pair of broken lines GBP, neither of the radially outward parts of the two main groove portions is aligned in parallel configuration to their respective parts of the groove base. Furthermore the groove base is substantially displaced from the centerline of both of the main groove portions towards the trailing edge ITE of the adjacent tread block. Accordingly the axial groove has an asymmetric cross-section varying along its length.

The general angle of inclination to the tread surface of the groove sidewall faces LF1 and LF2 is substantially greater than that of the opposing faces TF1 and TF2. Furthermore regarding each axial groove main portion of grooves CAG and IAG, whereas the angle of sidewall inclination of faces TF1, TF2 at the block trailing edge decrease from the axially inner end to the other end of the groove portion for the opposing groove sidewall the angle increase. Accordingly this configuration provides greater ramp support or buttressing to the leading edge LE of the tread block than that provided to the trailing edge TE of the adjacent block. In the particular embodiment illustrated in the Figures, the angle of inclination of the groove sidewall buttressing the block trailing edge reduces to zero at the axially outer part of each groove main portion.

The asymmetry of the V-shaped axial grooves CAG and IAG is illustrated in FIG. 5 wherein FIGS. 5a–5k show the cross-sectional shape of the grooves at specific indicated points.

Turning now to the outer axial shoulder groove OAG which is formed in the outer shoulder region of the tire and which is shown particularly in FIGS. 5 and 5a–5k, this groove OAG whilst having a general configuration similar to the other two axial grooves is different in that it has a depth which decreases axially outwardly accompanying a change in cross-sectional shape from V-shaped to flat bottomed. This can be seen in FIG. 5a onwards. However of particular importance to the present invention is the groove sidewall OTF on the side of the leading block edge. This comprises two main groove portions OTF2, OTF1, having unlike the other groove portions a constant inclination to the tread surface. Specifically the axially inner portion of this sidewall OTF2 has an inclination of 22° shown in FIGS. 5a and 5b whilst the axially outer portion OTF1 has an inclination of 14° as shown in FIG. 5c. This combination of constant angle of sidewall inclination and reducing groove depth in the outer axial groove provides specially continued buttressing to the leading edge of the tread blocks in the shoulder which prevents heel and toe irregular wear.

Of course the specific inclination angles of 14° and 22° are specified for this particular example.

Angles in the range of 10° to 25° can be used. In general for tires of sizes for trucks the angles are in the range of ±2° around the angles of the embodiments.

With regard to the circumferential grooves ILG and OLG these have a configuration wherein the groove base part extends circumferentially straight but the radially outer part comprises portions which are inclined to the circumferential direction and which also vary in width. Thus, these grooves whilst being straight circumferential grooves at their base, have a zigzag configuration of varying width in their radially outer part comprising alternative portions of 6.0 mm and 8.5 mm width.

The tire of the invention may also have other tread pattern features common in the art such as shallow grooves, knife cuts or sipes.

What is claimed is:

1. A tire having a ground contacting tread, the tread having a directional tread pattern comprising at least two substantially circumferentially extending grooves disposed one each side of the tread circumferential centerline and a plurality of circumferentially spaced apart and substantially axially extending shoulder grooves extending axially outwardly from each circumferential groove to the tread edge to define a row of tread blocks in each axially outer tread shoulder part, the axially extending grooves having two opposing inclined sidewalls which provide ramp support to the adjacent tread block edge, wherein each of the axially extending shoulder grooves has a groove depth which reduces from an axially inward part in a direction towards an axially outer part, and each axially extending shoulder groove comprises two groove main portions connected end to end, each groove main portion having a varying asymmetric cross-section along its length, each groove main portion having a first groove sidewall having a constant first angle of inclination with respect to a line normal to the surface of the tread and an opposing second groove sidewall having a varying second inclination angle with respect to a line normal to the surface of the tread, the constant first angle being greater than the maximum value of the second inclination angle, the first groove sidewall of each groove main portion being disposed on the same side of the axially extending shoulder groove, wherein the at least two groove main portions extend substantially in the same direction but are circumferentially dislocated from each other by a distance less than their widths.

2. A tire according to claim 1, wherein the variable second angle of inclination of the first and second groove main portions decreases from the axially inward part to the axially outer part of the groove portion.

3. A tire according to claim 1, wherein the second angle varies within the range of 0° to 10°.

4. A tire according to claim 1, wherein the second angle varies from 0° to 6°.

5. A tire according to claim 1, wherein the constant first angle is in the range of 10°–25°.

6. A tire according to claim 1, wherein the depth of the axially extending shoulder groove reduces progressively from the axially inward part to the outer part.

7. A tire according to claim 1, wherein the depth of the axially extending shoulder groove varies between 100% and 50% of the full tread depth of the circumferentially extending grooves.

8. A tire according to claim 1, wherein each groove main portion is curved in its longitudinal direction.

9. A tire according to claim 1, wherein the tread comprises axial grooves defining tread blocks in the central region between the shoulder regions, the axial grooves in the central region comprising at least two groove main portions connected end to end, each groove main portion having a substantially constant depth and varying asymmetric cross-section along its length and each having a first groove sidewall of varying first inclination angle and a second groove sidewall of varying second inclination angle, the first inclination varying angle being greater than the second varying inclination angle and the first groove sidewall of each groove main portion being disposed on the same side of the axial groove.

10. A tire according to claim 9, wherein the first groove sidewall of the groove main portions of the central axial grooves has an inclination angle which increases from the axially inward part to the axially outward part.

11. A tire according to claim 10, wherein the second groove sidewall of the groove main portions of the central axial grooves has an inclination angle which decreases from the axially inward part to the axially outward part.

12. A tire according to claim 1, wherein the second groove sidewall is a trailing face of a tread block and the first groove sidewall is the leading face of a tread block.

13. A tire according to claim 12, wherein the second angle of inclination decreases from the axially inward part to the axially outer part.

14. A tire having a ground contacting tread, the tread having a directional tread pattern comprising at least two substantially circumferentially extending grooves disposed one each side of the tread circumferential centerline and a plurality of circumferentially spaced apart and substantially axially extending shoulder grooves extending axially outwardly from each circumferential groove to the tread edge to define a row of tread blocks in each axially outer tread shoulder part, the axially extending grooves having two opposing inclined sidewalls which provide ramp support to the adjacent tread block edge, wherein each of the axially extending shoulder grooves has a groove depth which reduces from an axially inward part in a direction towards an axially outer part, and each axially extending shoulder groove comprises two groove main portions connected end to end, each groove main portion having a varying asymmetric cross-section along its length, each groove main portion having a first groove sidewall having a constant first angle of inclination with respect to a line normal to the surface of the tread and an opposing second groove sidewall having a varying second inclination angle with respect to a line normal to the surface of the tread, the constant first angle being greater than the maximum value of the second inclination angle, the first groove sidewall of each groove main portion being disposed on the same side of the axially extending shoulder groove, wherein the second groove sidewall is a trailing face of a tread block and the first groove sidewall is the leading face of a tread block.

* * * * *